March 28, 1961    H. H. BASCOM    2,976,738
CONVEYOR PULLEYS
Filed Nov. 26, 1957

INVENTOR.
Hollis H. Bascom
BY Townsend and Townsend
Attorneys

United States Patent Office 2,976,738
Patented Mar. 28, 1961

2,976,738
CONVEYOR PULLEYS

Hollis H. Bascom, Livermore, Calif., assignor to California Industrial Development Co., Livermore, Calif., a corporation of California Filed Nov. 26, 1957, Ser. No. 699,098
1 Claim. (Cl. 74—230.7)

This invention relates to improvements in conveyor belt pulleys and more particularly to conveyor belt pulley structures having an integral non-slip or non-skid surface in order that better contact and gripping connection may be made with conventional conveyor belts of various types and kinds.

It is a common problem in the field of conveyor belt pulleys to find a suitable means to support and drive conveyor belts of various types and kinds without undue slippage and which will also have a life of wear which is adequate. In the past, the surfaces of conveyor belt pulleys have been treated with many materials and have been formed in many ways all of which have drawbacks now overcome by the present invention which provides an extremely long life for the pulley together with a non-slip or non-skid surface.

In heavy duty conveyor belt systems, it has been found that a steel or a similar metal pulley has an advantage over rubber or other type materials of similar nature and yet it is necessary to provide a surface on the pulleys which will allow for a good frictional connection between the pulley surface and the belt and which surface must have a resistance to oil, water, chemicals, dirt and other materials which can destroy the effective life of a conveyor system through deterioration of the pulley surface.

One of the defects found in prior conveyor belt pulleys was the tendency of the surfacing material to strip off from the pulley itself and thus render the pulley either completely inoperable or so inefficient as to be practically useless. It is an object of the present invention to provide an integral pulley construction which has a built-on pulley surface which is very wear-resistant and withstands oil, dirt, water and the other materials commonly found to destroy the effective life of pulleys minerally.

In addition, the pulley of the present invention may be repaired without having to dismantle the entire conveyor belt line and thus the consequent loss through shut-down time.

The principal advantage of the present invention is to provide a pulley having a steel or other similar body and provided with a coating of surfacing material which is wholly resilient. The material comprises essentially a matrix or adhesive base consisting essentially of a resilient rubber-resin material together with an admixture of solid rubber particles in order to present an uneven, rough, non-slip or non-skid surface. The prime advantage of the surfacing area described is that it is entirely and permanently resilient, that is, both the matrix and the projecting particles are resilient and thus, do not distort, break or otherwise rupture as in pulley surfacings of the past which contained rigid materials either in the sense of a film which was rigid or non-flexible particles contained in the film which were rigid or non-flexible.

A further advantage of the present invention is that the surfacing of the improved pulley serves as a cushioning agent and noise deadening component of the conveyor system.

Other advantages and objects of the present invention will become apparent upon reference to the accompanying drawings and specifications in which similar parts are indicated by similar reference numerals.

Figure 1:
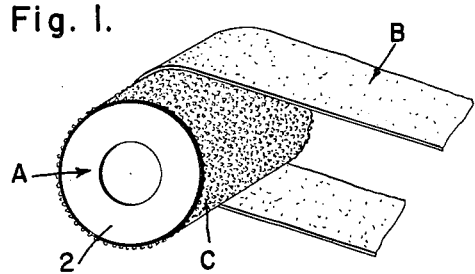
Fig. 1 is a diagrammatic fragmentary view of a pulley and conventional conveyor belt, the conveyor belt being broken away.
Figure 2:
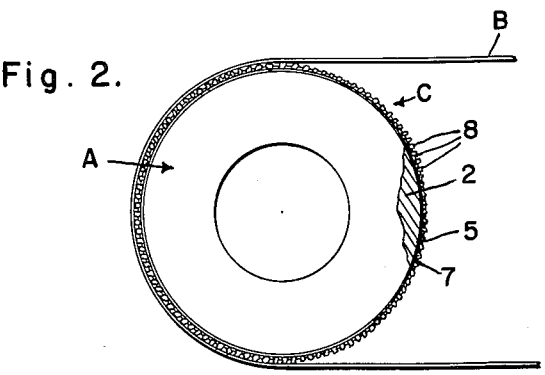
Fig. 2 shows a vertical sectional view of a conveyor belt pulley and a conventional conveyor belt.

For purposes of describing the present invention, it will be assumed that the conveyor pulley consists of a cylindrical steel pulley of any given desirable dimension and provided with the appropriate connections for driving and mounting the pulley to thus drive and support the conveyor belt.

In the drawings, a pulley is indicated at A while a belt of conventional design and which forms no part of the present invention and which may be composed of any material of satisfactory type for any particular given service is designated at B. Inasmuch as the steel structure of the pulley forms no part of the present invention, it may be considered to be solid or hollow or any other type of conventional pulley and it may also be formed of steel, aluminum, or other metal or alloy, plastic, or any other desirable material. For purposes of easy description, the body or shell of the pulley will hereinafter be designated as 2 and may consist of any desirable material although shown in the drawings as indicated as steel. In the description and claim "steel" will be intended to include any suitable pulley body material. Applied to the cylindrical body 2 is a surfacing material which presents a rough uneven surface C and which is characterized as being wholly and entirely consisting of permanently resilient materials.

Figure 3:
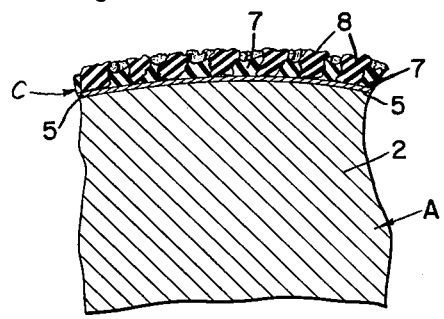
Fig. 3 is a fragmentary enlarged portion of a pulley of the present invention.

The surfacing C is illustrated in enlarged section in Fig. 3 and can be seen as consisting of a sealer indicated at 5 which is applied directly to the body 2 and thereover a surfacing which consists of a resilient adhesive matrix film or carrier base 7 and solid rubber particles which project therefrom indicated at 8. It will be noted that the rubber particles 8 project through or above the film 7 and are anchored in the resilient film. Thus the projecting particles 8 are themselves permanently resilient and are anchored in a permanently resilient base material to thus prevent the normal wear and breakage occasioned by materials having a less resilient nature or vastly different co-efficients of flexure.

The non-slip characteristics of the improved pulley is greatly increased over a plain rubber surface or a surface which has been grooved or pitted as known to the prior art.

In carrying out the present invention, I have found that a good carrier or adhesive matrix material is known to the trade as "Pliobond" which is a product of the Chemical Division of the Goodyear Tire and Rubber Company of Akron, Ohio. "Pliobond" is essentially a synthetic rubber phenolic resin liquid cement and wherein the bonding ingredients, namely rubber and resin, are mixed in a solution of a solvent, namely methyl ethyl ketone and wherein the solid materials may vary somewhere between about twenty to thirty percent. The carrier material has a very high resistance to abrasion, good adhesion to all types of surfaces and a very high bonding strength, permanent flexibility or resilience and a high resistance to elements and compounds both organic and inorganic. In addition, it has good electrical insulating qualities.

To supply the particle characteristics for the material, I prefer to employ ground or abraded rubber particles which may be obtained from tire retreading waste which is then passed through a suitable mesh or screen depending upon the type of pulley lagging surface characteristic desired. By way of example, in order to produce a pulley having a comparatively smooth surfacing, I employ rubber particles obtained from ground tire retreading waste which pass a Tyler standard No. 16 screen. The particles are mixed thoroughly with an approximate equal volume of the liquid rubber-resin cement and the two are mixed thoroughly together and applied to the pulley-body by any suitable means such as spraying, dipping, brushing or the like. As previously indicated, a sealer material of any suitable type such as the "Pliobond" material previously referred to above may be first applied to the steel body before the surfacing material is applied. In order to prepare a rough lagging surface, I employ rubber particles which pass a standard Tyler No. 8 screen and in approximate equal volumes of cement and solid particles. The thickness of the surfacing material applied to the core or body 2 may vary within the range of from $\frac{1}{16}''$ to $\frac{1}{4}''$.

The conveyor belt pulley produces desirable characteristics not heretofore available to industry.

While I have described the invention in some detail through reference to example, it is understood that modifications and alterations in procedures described may be practiced within the spirit of the invention and scope of the appended claim.

What is claimed is:

A conveyor belt pulley construction comprising a cylindrical pulley body and an external surfacing therefor comprising an admixture of solid particles consisting solely of rubber; and a synthetic rubber-phenolic resin in which the resin is formed in a film binding the particles in spaced apart relationship onto the pulley with the rubber particles projecting outwardly to form an uneven mat wherein both said resin film and said solid particles are completely and permanently resilient.

References Cited in the file of this patent

UNITED STATES PATENTS

| | | |
|---|---|---|
| 1,330,988 | Sayre | Feb. 17, 1920 |
| 1,793,927 | Griffith | Feb. 24, 1931 |
| 2,182,774 | Birnbaum | Dec. 12, 1939 |
| 2,241,391 | Bollinger | May 13, 1941 |
| 2,678,081 | Rainard et al. | May 11, 1954 |

FOREIGN PATENTS

| | | |
|---|---|---|
| 383,962 | Great Britain | Nov. 24, 1932 |